United States Patent
Ihm et al.

(10) Patent No.: US 8,351,364 B2
(45) Date of Patent: Jan. 8, 2013

(54) METHOD FOR TRANSMITTING DATA IN WIRELESS COMMUNICATION SYSTEM

(75) Inventors: Bin Chul Ihm, Anyang-si (KR); Hyun Soo Ko, Anyang-si (KR); Sung Ho Park, Anyang-si (KR); Sergey Sergeyev, Nizhny Novgorod (RU); Victor Ermolaev, Nizhny Novgorod (RU); Alexander Flaksman, Nizhny Novgorod (RU)

(73) Assignee: LG Electronics Inc., Seoul (KR)

( * ) Notice: Subject to any disclaimer, the term of this patent is extended or adjusted under 35 U.S.C. 154(b) by 429 days.

(21) Appl. No.: 12/448,531

(22) PCT Filed: Mar. 6, 2008

(86) PCT No.: PCT/KR2008/001285
§ 371 (c)(1),
(2), (4) Date: Jun. 24, 2009

(87) PCT Pub. No.: WO2008/123662
PCT Pub. Date: Oct. 16, 2008

(65) Prior Publication Data
US 2010/0027487 A1  Feb. 4, 2010

(30) Foreign Application Priority Data
Apr. 10, 2007 (KR) .................. 10-2007-0035043

(51) Int. Cl.
*H04H 20/71* (2008.01)

(52) U.S. Cl. ........ 370/312; 370/329; 370/338; 370/341; 370/432; 370/315; 714/748; 714/749

(58) Field of Classification Search .................. 370/315, 370/329, 338, 312, 341, 432; 455/11.1; 714/748, 714/749
See application file for complete search history.

(56) References Cited

U.S. PATENT DOCUMENTS

| 4,882,765 A | * | 11/1989 | Maxwell et al. ................ 455/18 |
| 2003/0064754 A1 | | 4/2003 | Wilson et al. |
| 2004/0114618 A1 | | 6/2004 | Tong et al. |
| 2006/0029002 A1 | | 2/2006 | Zheng et al. |
| 2006/0031924 A1 | | 2/2006 | Kwon et al. |
| 2007/0002766 A1 | * | 1/2007 | Park et al. ..................... 370/254 |
| 2008/0009320 A1 | * | 1/2008 | Rikkinen et al. ............. 455/560 |
| 2008/0031177 A1 | * | 2/2008 | Lee et al. ....................... 370/312 |
| 2012/0008545 A1 | * | 1/2012 | Zhang et al. .................. 370/315 |

FOREIGN PATENT DOCUMENTS

| CN | 1522521 A | 8/2004 |
| CN | 1901400 A | 1/2007 |
| WO | WO 03/092223 A1 | 11/2003 |
| WO | 2006/091029 A1 | 8/2006 |

* cited by examiner

*Primary Examiner* — Christopher Grey
(74) *Attorney, Agent, or Firm* — McKenna Long & Aldridge LLP (57) ABSTRACT

A method for transmitting data in a wireless communication system provides transmitting a cluster allocation message, which informs at least one user equipment that the user equipment belongs to a cluster, to the at least one user equipment, and receiving a response to the cluster allocation message from user equipments belonging to the cluster. Small envelope correlation coefficient can be obtained without increasing the size of a user equipment.

4 Claims, 5 Drawing Sheets

INITIAL TRANSMISSION

RE-TRANSMISSION

METHOD FOR TRANSMITTING DATA IN WIRELESS COMMUNICATION SYSTEM

This Application is a 35 U.S.C. §371 National Stage Entry of International Application No. PCT/KR2008/001285, filed Mar. 6, 2008 and claims the benefit of Korean Application No: 10-2007-0035043, filed Apr. 10, 2007, all of which are incorporated by reference in their entirety herein.

TECHNICAL FIELD

The present invention relates to wireless communication, and more particularly, to a method of transmitting data in a wireless communication system.

BACKGROUND ART

Next-generation mobile communication systems, which have been recently actively conducted, are required to process and transmit various data such as packet data in addition to audio data.

Furthermore, the next-generation mobile communication systems are required to transmit high-quality large-capacity multimedia data at a high speed under limited radio resources. Accordingly, it is required to overcome inter-symbol interference and frequency selective fading while maximizing spectral efficiency. Among techniques developed to maximize the spectral efficiency, multiple-input multiple-output (MIMO) system is most spotlighted.

The MIMO system can provide dramatic increase in wireless channel capacity only by increasing the number of antennas without enlarging mean transmit power and extending frequency bandwidth. Since it is expected that next-generation wireless communication system requires data rate higher than 20 Mbps, the MIMO system must be used in order to achieve the data rate.

There are different ways of creating MIMO system. BLAST (Bell Labs Layered Space Time), STBC (Space Time Block Code) and STTC (Space Time Trellis Code) are open-loop systems which do not require a transmitter to know channel information while reducing system complexity. Singular value decomposition (SVD) is more efficient technique but it is a closed-loop system which requires a transmitter to know channel information.

The MIMO technique involves obtaining a de-correlated communication channel which appears due to multi-path propagation of signals. Although most of current user equipments have a single antenna, the MIMO system requires multiple antennas. The multiple antennas should be designed to provide low cross-correlation coefficient and equal relative signal strength level between the signals received by each antenna. The cross-correlation between too received signals can be characterized by envelope correlation coefficient (ECC). A good efficiency of MIMO system can be obtained when ECC is smaller than 0.5 and average received power form each antenna is the same.

However, the ECC increases, when the distance between antennas becomes small. The important problem in application of MIMO system is the small sizes of a user equipment. Since the size of the user equipment is small, designers cannot increase the distance between antennas. Moreover, the design trend of the user equipment assumes that in the future the sizes of the user equipment will be only decreased. The decreasing of the sizes is expected through the increasing the density of components location inside the user equipment. In this situation assembling more than one antenna is also the problem, because antenna is going to become one of the largest components of the user equipment. When multiple antennas are used in the same frequency, the technical challenges become very complex. There are two main reasons of this. First, it is difficult to implement multiple antennas in something as small as a user equipment. Secondly, the performance of the device antenna will be degraded by the effect of electromagnetic inter-antenna coupling inside the user equipment. Therefore, a method for efficiently creating a MIMO system is needed.

DISCLOSURE OF INVENTION

Technical Problem

The present invention provides a method for transmitting data in a multiple antenna system using clustering of a plurality of user equipments.

The present invention also provides a method for transmitting data in a multiple antenna system using a plurality of user equipments each of which has a single antenna.

Technical Solution

In one aspect, a method for transmitting data in a wireless communication system provides transmitting a cluster allocation message, which informs at least one user equipments that the user equipment belongs to a cluster, to the at least one user equipment, and receiving a response to the cluster allocation message from user equipments belonging to the cluster.

In another aspect a method of cooperatively transmitting data includes listening to data transmitted from a main user equipment to the base station, the main user equipment belonging to a cluster, the cluster includes a plurality of user equipments each having a single antenna, receiving a request for re-transmission of the data from the base station and transmitting re-transmission data with respect to the data.

In still another aspect, a method of transmitting data includes receiving the data from a first user equipment, transmitting a request for re-transmission of the data, receiving first re-transmission data with respect to the data from the first user equipment and receiving second re-transmission data with respect to the data from a second user equipment that listens to the data transmitted from the first user equipment, wherein the first user equipment and the second user equipment belongs to same cluster.

ADVANTAGEOUS EFFECTS

By MIMO system based on clustering of multiple user equipments, small ECC can be obtained without increasing the size of a user equipment. Furthermore, the MIMO system can be easily constructed using the existing user equipment having at least one antenna.

MODE FOR THE INVENTION

A technique described herein can be used to various communication systems including code division multiple access (CDMA) systems, wideband CDMA (WCDMA) systems, frequency division multiple access (FDMA) systems, time division multiple access (TDMA) systems, orthogonal frequency division multiplexing (OFDM) systems and orthogonal frequency division multiple access (OFDMA) systems. OFDM/OFDMA is a multi-carrier modulation technique that efficiently divides a system bandwidth into multiple orthogonal subbands. A subband can refer to a tone, a resource block and a bin. Each subband is associated with each subcarrier with which data is modulated.

Figure 1:
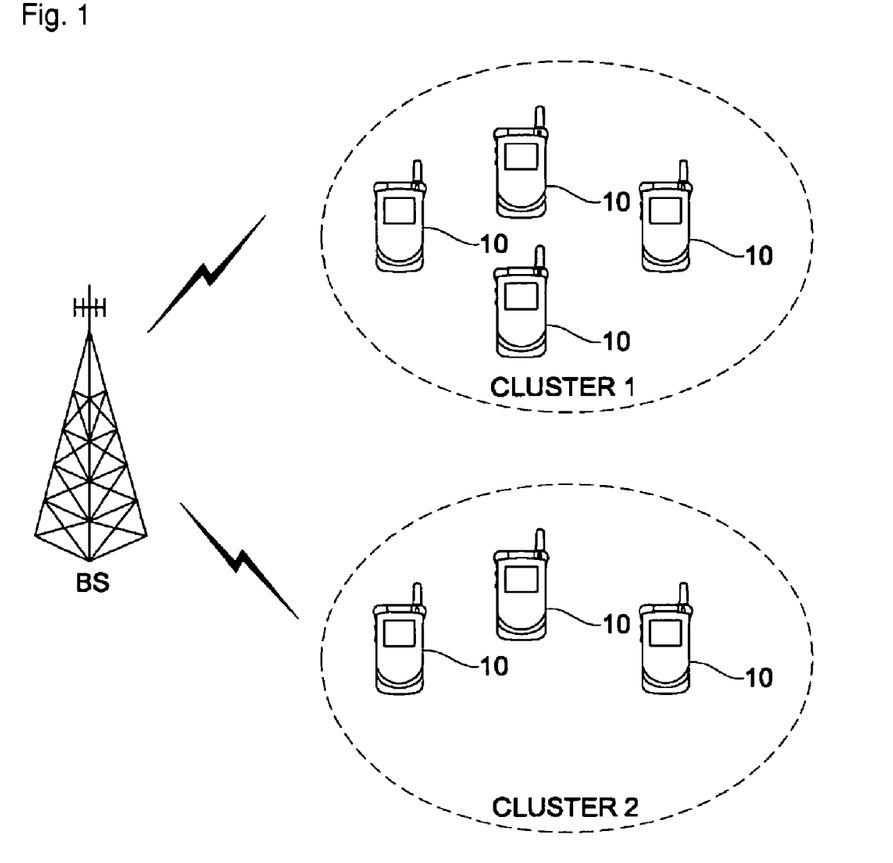
FIG. 1 illustrates a configuration of a wireless communication system.

FIG. 1 illustrates a configuration of a wireless communication system. The wireless communication system provides various communication services such as audio data and packet data.

Referring to FIG. 1, a wireless communication system includes a plurality of user equipments 10 and a base station 20. A user equipments are fixed or mobile and can be also referred to as a mobile station, a user terminal, a subscriber station and a wireless device. The base station 20 corresponds to a fixed station that communicates with the user equipment 10 and can be also referred to as a node-B, a base transceiver system and an access point. A single base station can include at least one cell.

Downlink means communication from the base station 20 to the user equipments 10 and uplink means communication from the user equipments 10 to the base station 20 hereinafter.

The base station 20 can group the user equipments 10 belonging to its coverage area into at least one cluster. Or, a user equipment 10 can request the base station 20 to assign a cluster. A cluster means a set of user equipments. Although FIG. 1 illustrates to clusters in a cell, the number of clusters and the number of user equipments belonging to one cluster are not limited.

Downlink transmission is performed from the base station 20 to a cluster and uplink transmission is performed from the cluster to the base station 20. The base station 20 can include multiple antennas and each of the user equipments 10 can include one antenna. When data is transmitted from the base station 20 to a cluster, user equipments 10 belonging to the cluster can function as at least one receiving antenna. Each of the user equipments 10 relays a received signal to the other user equipments in the cluster. The user equipments 10 in the cluster cooperatively receive signals.

Data is transmitted from a cluster to the base station 20, the user equipments 10 in the cluster function as at least one transmit antenna. The user equipments 10 in the cluster transmit signals to the base station 20 through cooperative transmission. Accordingly, it can be considered that transmission from the base station to a cluster of user equipments corresponds to downlink transmission of MIMO system and transmission from the cluster of user equipments to the base station corresponds to uplink transmission of MIMO system. In this system each user equipment has only one antenna but a number of closely located terminals can create a cluster operating as a multiple antenna transceiver in MIMO system and serving to each user equipment concurrently.

Almost everybody has at least one user equipment these days. Therefore the density of user equipments is approximately equal the density of population. Urban environment such as offices, supermarkets, stadiums and the like has the highest density of user equipments.

Data is transmitted from a base station to a cluster of user equipments or from the cluster of user equipments to the base station. Each user equipment has at least one antenna. Neighboring user equipments form a cluster. User equipments in the cluster act as a multiple antenna transmitter and/or receiver in MIMO system. The user equipments in the cluster concurrently operate. The user equipments in the cluster can communicate with each other in the same manner as the communication between a user equipment and a base station or using a well-know local-area communication technique, for example, Bluetooth or wireless local area network (LAN) based on IEEE 802.11 standard.

A average distance between user equipments in a cluster is sufficiently big to provide small envelope correlation coefficient (ECC). The number of user equipments in the cluster can be sufficiently large (in general, more than 4) so that the cluster provides good performance. Accordingly, system throughput can be increased due to parallel transmission of the MIMO technique. Quality and reliability of received information (decreasing bit error rate) are higher due to effective mitigation of signal fading. Coverage becomes larger because the effective SNR for the cluster is higher than that for one user equipment. Spectral efficiency becomes higher because user terminals including in the cluster operate at the same frequency and at the same time. In conventional system they use different frequencies or different time intervals. This system doesn't require an additional power supply. This system doesn't require extending frequency band.

Figure 2:
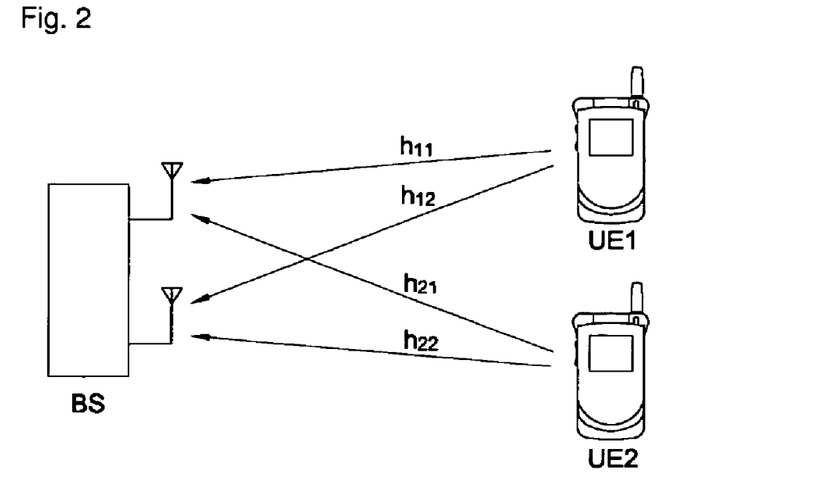
FIG. 2 illustrates modeling of a 2×2 MIMO system.

FIG. 2 illustrates modeling of a 2×2 MIMO system.

Referring to FIG. 2, a 2×2 MIMO system includes a base station (BS) having two antennas and two user equipments (UEs). A user equipment has a single antenna.

A channel matrix H can be represented for 2×2 MIMO system in the form

MathFigure 1

$$H = \begin{bmatrix} h_{11} & h_{21} \\ h_{21} & h_{22} \end{bmatrix}$$ [Math. 1]

where $h_{ij}$ denotes a channel from the antenna of an i-th user equipment to a j-th antenna of the base station.

Eigenvalues $\lambda_1$ and $\lambda_2$ and eigenvectors $U_1$ and $U_2$ of the channel matrix H can be obtained as shown MathFigure 2

$$HH^H = \begin{bmatrix} h_{11} & h_{21} \\ h_{12} & h_{22} \end{bmatrix} \begin{bmatrix} h_{11}^* & h_{12}^* \\ h_{21}^* & h_{22}^* \end{bmatrix}$$ [Math. 2]
$$= \begin{bmatrix} |h_{11}|^2 + |h_{21}|^2 & h_{12}^* h_{11} + h_{22}^* h_{21} \\ h_{11}^* h_{12} + h_{21}^* h_{22} & |h_{12}|^2 + |h_{22}|^2 \end{bmatrix}$$
$$\equiv \begin{bmatrix} a_1 & g_1 \\ g_1^* & b_1 \end{bmatrix}$$

where $(\cdot)^H$ is a Hermitian matrix and $(\cdot)^*$ is a complex conjugate.

To obtain two eigenvalues of the channel matrix H, following equation should be solved.

MathFigure 3

$$\begin{vmatrix} a_1 - \lambda & g_1 \\ g_1^* & b_1 - \lambda \end{vmatrix} = 0 \qquad [\text{Math. 3}]$$

The solution of Equation 3 gives two eigenvalues as follows.

MathFigure 4

$$\lambda_{1,2} = \frac{1}{2}\left(a_1 + b_1 \pm \sqrt{(a_1 - b_1)^2 + 4|g_1|^2}\right) \qquad [\text{Math. 4}]$$

The eigenvectors can be obtained from the solution of following equalities.

MathFigure 5

$$\begin{bmatrix} a_1 - \lambda_1 & g_1 \\ g_1^* & b_1 - \lambda_1 \end{bmatrix} U_1 = 0, \begin{bmatrix} a_1 - \lambda_2 & g_1 \\ g_1^* & b_1 - \lambda_2 \end{bmatrix} U_2 = 0 \qquad [\text{Math. 5}]$$

The solution of Equation 5 is as follows.

MathFigure 6

$$U_1 = \begin{bmatrix} u_{11} \\ u_{12} \end{bmatrix} = \frac{1}{\sqrt{(b_1 - \lambda_1)^2 + |g_1|^2}} \begin{bmatrix} b_1 - \lambda_1 \\ -g_1^* \end{bmatrix},$$

$$U_2 = \begin{bmatrix} u_{21} \\ u_{22} \end{bmatrix} = \frac{1}{\sqrt{(a_1 - \lambda_2)^2 + |g_1|^2}} \begin{bmatrix} -g_1 \\ a_1 - \lambda_2 \end{bmatrix} \qquad [\text{Math. 6}]$$

The eigenvectors are orthonormal. That is, $U_i^H U_j = 1$ when i=j, and $U_i^H U_j = 0$ when i≠j.

It is assumed that to signals $c_1$ and $c_2$ are concurrently transmitted through uplink channels. That is, one user equipment transmit the signal $c_1$ using a weighting vector $$V_1 = \frac{1}{\sqrt{\lambda_1}} H^H U_1$$

and the other user equipment transmit the signal c2 using a weighting vector $$V_2 = \frac{1}{\sqrt{\lambda_2}} H^H U_2$$

Both to weighting vectors are orthonormal like eigenvectors $U_1$, $U_2$. A signal vector S transmitted from a cluster is as follows. 을 사용한다.

MathFigure 7

$$S = c_1 V_1 + c_2 V_2 \qquad [\text{Math.7}]$$

Using the property of eigenvectors, namely $HH^H U_i = \lambda_i U_i$, a signal vector X received at the base station is represented as follows.

MathFigure 8

$$\begin{aligned} X &= HS \\ &= c_1 HV_1 + c_2 HV_2 \\ &= c_1 \frac{HH^H U_1}{\sqrt{\lambda_1}} + c_2 \frac{HH^H U_2}{\sqrt{\lambda_2}} \\ &= c_1 \sqrt{\lambda_1}\, U_1 + c_2 \sqrt{\lambda_2}\, U_2 \end{aligned} \qquad [\text{Math. 8}]$$

Now, signal processing in the base station is considered. For signal processing, the eigenvectors $U_1$, $U_2$ are applied and orthonormal property of the eigenvectors are used. Taking into account receiver noise after signal processing, received signals can be represented as shown MathFigure 9

$$d_1 = U_1^H X = c_1\sqrt{\lambda_1}, d_2 = U_2^H X = c_2\sqrt{\lambda_2} + Z_2 + z_2 \qquad [\text{Math.9}]$$

where $d_1$ and $z_1$ respectively denote a received signal and noise for a first antenna, and $d_2$ and $z_2$ respectively denote a received signal and noise for a second antenna.

Accordingly, the two signals from the cluster to the base station can be transmitted independently and concurrently. 'Cluster-base station' communication can be performed in the same manner as a general MIMO system. While uplink transmission of 'cluster-base station' has been described, downlink transmission of 'base station-cluster' can be easily performed by skilled in the art.

Figure 3:
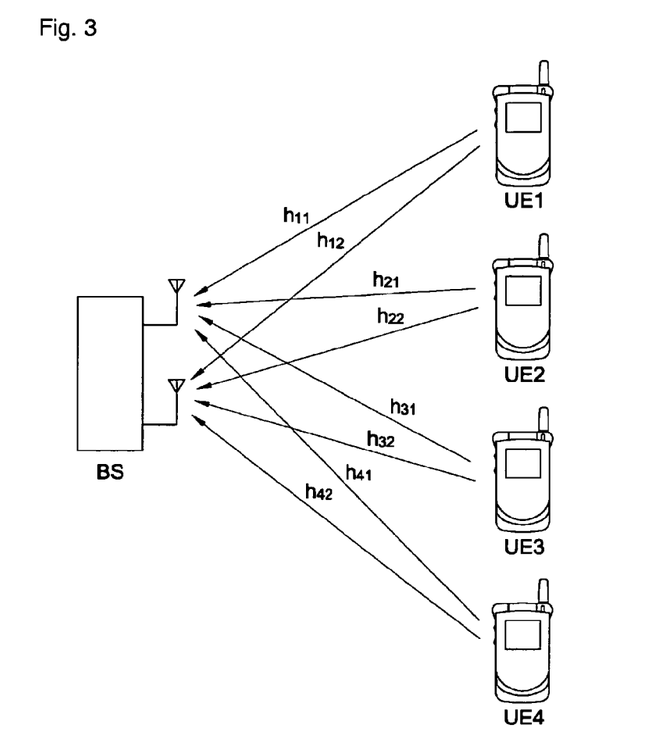
FIG. 3 illustrates modeling of a 4×2 MIMO system.

FIG. 3 illustrates modeling of a 4×2 MIMO system.

Referring to FIG. 3, a 4×2 MIMO system includes a base station (BS) having to antennas and four user equipments (UEs). Each user equipment has one antenna. A channel matrix H is represented as follows.

MathFigure 10

$$H = \begin{bmatrix} h_{11} & h_{21} & h_{31} & h_{41} \\ h_{12} & h_{22} & h_{32} & h_{42} \end{bmatrix} \qquad [\text{Math. 10}]$$

To obtain eigenvalues $\lambda_1$ and $\lambda_2$ and eigenvectors $U_1$ and $U_2$, following Equation is considered.

MathFigure 11

$$HH^H = \begin{bmatrix} \sum_{i=0}^{4} |h_{i1}|^2 & \sum_{i=0}^{4} h_{i1} h_{j2}^* \\ \sum_{i=0}^{4} h_{i2} h_{j1}^* & \sum_{i=0}^{4} |h_{i2}|^2 \end{bmatrix} \equiv \begin{bmatrix} a_2 & g_2 \\ g_2^* & b_2 \end{bmatrix} \qquad [\text{Math. 11}]$$

The eigenvalues are obtained as follows.

MathFigure 12

$$\lambda_{1,2} = \frac{1}{2}\left(a_2 + b_2 \pm \sqrt{(a_2 - b_2)^2 + 4|g_2|^2}\right) \qquad [\text{Math. 12}]$$

The eigenvectors are obtained as follows.

MathFigure 13

$$U_1 = \begin{bmatrix} u_{11} \\ u_{12} \end{bmatrix} = \frac{1}{\sqrt{(b_2 - \lambda_2)^2 + |g_2|^2}} \begin{bmatrix} b_2 - \lambda_2 \\ -g_2^* \end{bmatrix},$$ [Math. 13]

$$U_2 = \begin{bmatrix} u_{21} \\ u_{22} \end{bmatrix} = \frac{1}{\sqrt{(a_2 - \lambda_2)^2 + |g_2|^2}} \begin{bmatrix} -g_2 \\ a_2 - \lambda_2 \end{bmatrix}$$

It is assumed that one user equipment transmit the signal $c_1$ using a weighting vector $$V_1 = \frac{1}{\sqrt{\lambda_1}} H^H U_1$$

and the other user equipment transmit the signal $c_2$ using a weighting vector $$V_2 = \frac{1}{\sqrt{\lambda_2}} H^H U_2$$

Taking into account receiver noise after signal processing and the property $HH^H U_i = \lambda_i U_i$, received signals for respective antennas can be represented as shown MathFigure 14

$$d_1 = U_1^H X = c_1 \sqrt{\lambda_1} + z_1, d_2 = U_2^H X = c_2 X = c_2 \sqrt{\lambda_2} + z_2$$ [Math. 14]

where $d_1$ and $z_1$ respectively denote a received signal and noise for a first antenna, and $d_2$ and $z_2$ respectively denote a received signal and noise for a second antenna.

A transmission gain is defined by the eigenvalues shown in Equations 9 and 14. This means that transmission in the proposed MIMO system can be considered as transmission through eigenchannels.

The statistical properties of eigenchannels are described below.

Figure 4:
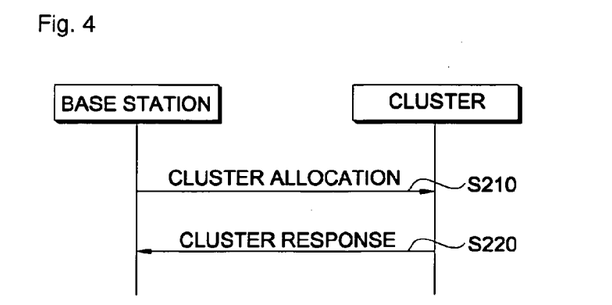
FIG. 4 is a graph showing probability functions of eigenvalues for a 2×2 MIMO system and a 4×3 MIMO system.

FIG. 4 is a graph showing probability functions of eigenvalues for a 2×2 MIMO system and a 4×3 MIMO system. Probability functions are calculated in the assumption of Reyleigh fading all the paths and the mean power of each path is equal to unit.

Referring to FIG. 4, a first eigenchannel of the MIMO 4×2 has the largest gain. Because the mean gain from one transmit antenna to one receiving antenna is equal to unit, the first eigenchannel of the MIMO 4×2 gives the benefit in gain equal or more 4 (6 dB) with probability 0.8 A second eigenchannel of the MIMO 4×2 also gives the benefit in gain (>1) with probability 0.8 A first eigenchannel of the MIMO 2×2 gives the benefit in gain equal or more 2 (3 dB) with probability 0.8 A second eigenchannel of the MIMO 2×2 doesn't give the benefit in gain in 80% events.

Now, a generalized MIMO system is considered. When the number of user equipments in a cluster is M and the number of antennas of a base station is N, transmission of OFDM signals from the cluster to the base station is considered.

In the frequency domain, a transmitted signal can be given for each frequency sub-carrier its complex envelope s(f). Signals $s_1(f)$, $s_2(f)$, $s_3(f)$, . . . , $s_M(f)$ transmitted from the cluster by user equipments can be made up in the form of a column vector $S(f) = [s_1(f) \ s_2(f) \ s_3(f) \ldots s_M(f)]T$ where upper index T denotes transpose.

In the OFDM system the signal duration is chosen so that the maximal delay in the channel is much less of the signal duration. This enables to consider the transformation of each sub-carrier signal in the channel with help of the set of complex transmission coefficients. Introducing the channel matrix H(f) of the dimension N×M signals received at the base station by N antennas can be written in the form of column-vector MathFigure 15

$$X(f) = H(f)S(f) + Z(f)$$ [Math.15]

where Z(f) denotes a vector of system noise.

Assume that the channel matrix H(f) is known perfectly. Using singular value decomposition (SVD) of the channel matrix H(f), the receive vector X(f) can be represented as shown MathFigure 16

$$X(f) = V(f)\Lambda^{0.5}(f)U^H(f)S(f) + Z(f)$$ [Math.16]

where $\Lambda^{0.5}(f)$ is a diagonal matrix of singular values of the channel matrix H(f), $\Lambda(f)$ is a diagonal matrix of eigenvalues of the matrix $H^H(f)H(f)$, U(f) and V(f) are two unitary matrixes consisting of orthonormal eigenvectors of dimension M and N respectively, the upper index H denotes Hermit conjugation.

The number of nonzero eigenvalues can be equal to K but always K≦min(M,N). Therefore both matrixes U(f) and V(f) comprise K eigenvectors.

Before transmission the vector S(f) must be calculated from the transformation S(f)=U(f)C(f), where C(f) is K-dimensional vector. At the base station the received vector X(f) must be transformed in signal vector $D(f)=V^H(f)X(f)$. As a result, the following equation can obtained.

MathFigure 17

$$D(f) = \Lambda^{0.5}(f)C(f) + Z'(f)$$ [Math.17]

where $Z'(f)=V^H(f)Z(f)$. Statistical properties of noise matrixes Z'(f) and Z(f) are the same.

Elements of the signal vector D(f) are represented as follows.

MathFigure 18

$$d_1(f) = \lambda_1^{0.5}(f)c_1(f) + z'_1(f)$$
$$d_2(f) = \lambda_2^{0.5}(f)c_2(f) + z'_2(f)$$
$$\vdots$$
$$d_K(f) = \lambda_K^{0.5}(f)c_K(f) + z'_K(f)$$ [Math. 18]

Accordingly, K independent equalities can be obtained. This means that K signals $c_1(f)$, $c_2(f)$, . . . , $c_K(f)$ can be transmitted independently and concurrently.

The K signals $d_1(f), d_2(f), \ldots, d_K(f)$ received from the base station differ from signals $c_1(f), c_2(f), \ldots, c_K(f)$ in real gain factors and additive noises. Thus the detection of received signals can be carried out independently by well-known way. Equalities shown in Equation 18 can be treated as transmission of information through an orthogonal eigenchannels.

The proposed MIMO system has the following advantages.

(1) Equalities shown in Equation 18 shows that system throughput can be increased due to parallel transmission in the MIMO system. The number of parallel information streams depends on the number of antennas and channel properties (the number of nonzero singular values of channel matrix).

(2) In comparison of 'user equipment-base station' with 'cluster-base station', M user equipments transmit signals concurrently and independently in the latter case. Thus the mean power can be enlarged. Besides eigenchannels have additive gains due to transmit and receiving diversities. This means a mean SNR (signal-to-Noise Ratio) is higher and fading is mitigated.

(3) Coverage becomes larger due to higher mean SNRs in eigenchannels.

(4) Spectral efficiency is higher because eigenchannels are orthogonal and therefore use equipments including in the cluster can operate at the same frequency and at the same time. In conventional system they must use different frequencies or different time intervals.

(5) The proposed MIMO system is supplied the power from user equipments and does not require additional power.

(6) The proposed MIMO system does not require extending frequency band because throughput can be increased due only to parallel transmission through eigenchannels.

Implementation of multiple antennas at a user equipment is a big technical problem concerned with the mitigation of electromagnetic coupling between antennas due to basically small size of the user equipments. Even two antennas implemented in the user equipment cannot be free from electromagnetic coupling. It leads to the big ECC and low efficiency of MIMO systems. According to the MIMO system based on clustering of user equipments, the requirements of small cross-correlation between antennas in the cluster can be easily fulfilled. The number of user equipments in the cluster can be sufficiently large so that the cluster provides a good performance.

Existing user equipments with one antenna can be updated for operating in MIMO based on clustering user equipments. The communication between user equipments can be provided by the system like Bluetooth or similar (WUSB, 802.11 or other).

A method of exchanging information for clustering between a base station and a user equipment is described.

Figure 5:
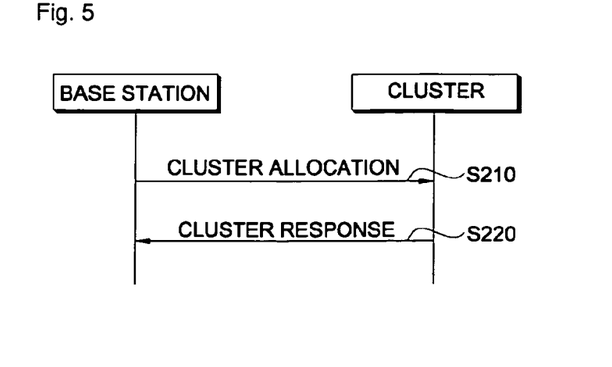
FIG. 5 is a flowchart showing a clustering request from a base station to a cluster.

FIG. 5 is a flowchart showing a clustering request from a base station to a cluster.

Referring to FIG. 5, a base station transmits a cluster allocation message to a cluster at step S210. The cluster allocation message informs user equipments that which user equipment belongs to the cluster. The cluster corresponds to a set of user equipments. The cluster allocation message can be transmitted through a broadcast channel, a multicast channel or a dedicated channel. Transmission through the broadcast channel means that the cluster allocation message is transmitted to all of user equipments belonging to a specific region (for example, a cell and/or a sector) and transmission through the multicast channel means that the message is sent to a specific group of user equipments.

Each user equipment that has received the cluster allocation message transmits a cluster response message to the base station at step S220. The cluster response message informs the base station that each user equipment belongs to a specific cluster.

Figure 6:
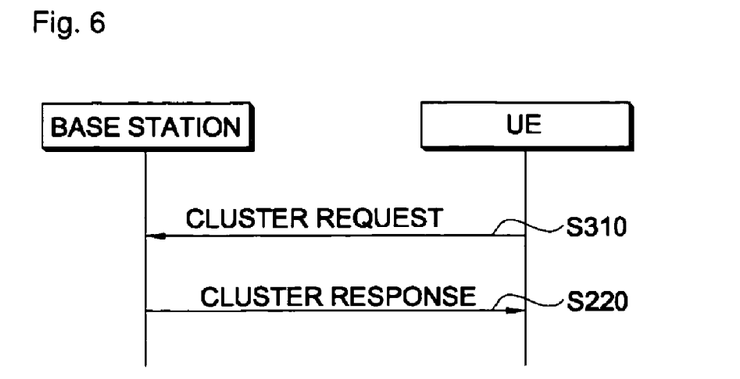
FIG. 6 is a flowchart showing a clustering request from a base station to a cluster.

FIG. 6 is a flowchart showing a clustering request from a base station to a cluster.

Referring to FIG. 6, a user equipment transmits a cluster request message to a base station at step S310. The cluster request message requests the base station to allow a user equipment to join in a specific cluster. The cluster request message can be transmitted through an uplink dedicated control channel. The user equipment recognizes neighboring user equipments and requests the base station to permit the user equipment to join in the specific cluster in order to perform cooperative transmission with the neighboring user equipments.

The base station transmits a cluster response message to the user equipment at step S320. The base station allows or disallows the user equipment to join in the specific cluster through the cluster response message.

Figure 7:
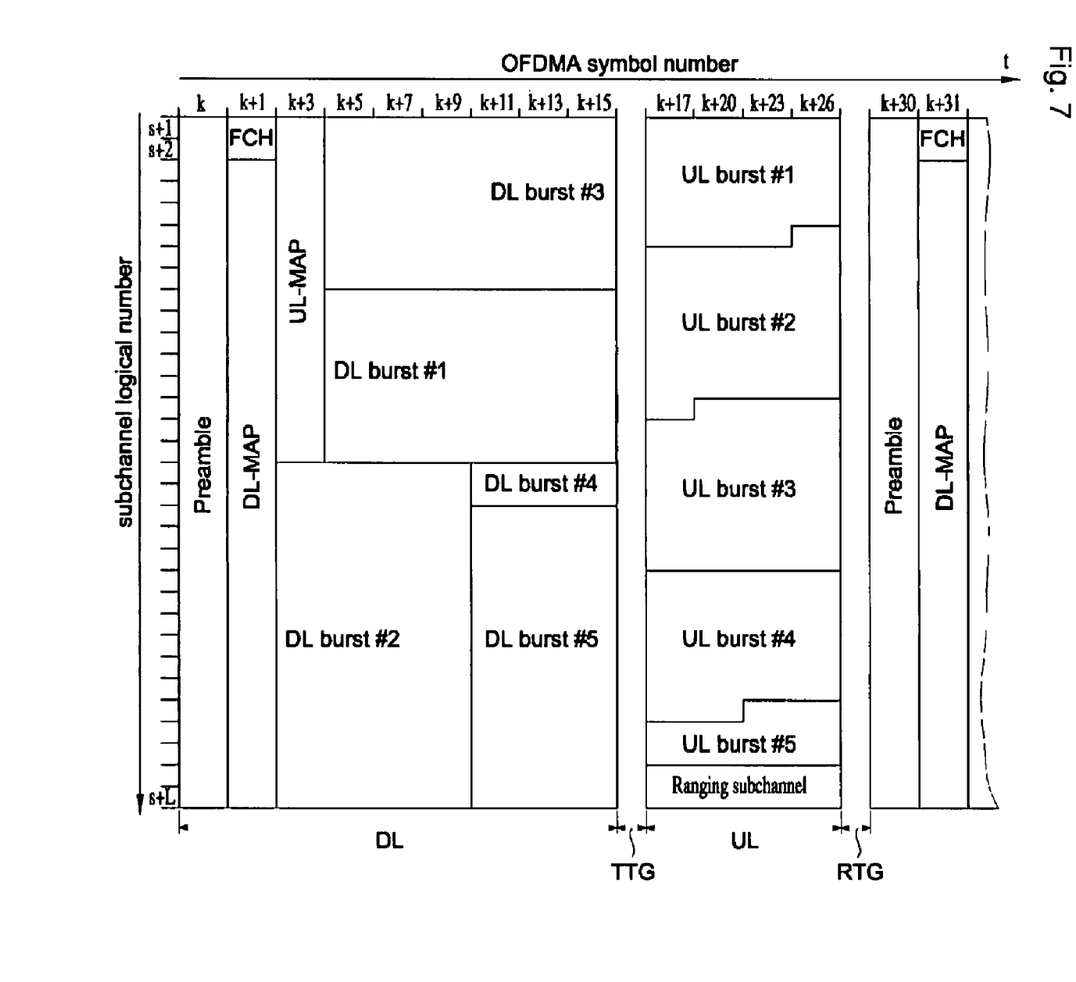
FIG. 7 illustrates an example of a frame structure of a MIMO system.

FIG. 7 illustrates an example of a frame structure of a MIMO system. A frame is a data sequence for a fixed time period used by physical specification. In FIG. 7, the horizontal axis represents OFDM symbol number and the vertical axis represents logical number of subchannels.

Referring to FIG. 7, a frame includes a downlink (DL) frame and an uplink (UL) frame. Time division multiplex is a method in which uplink transmission and downlink transmission share the same frequency but they are performed in different time periods. The downlink frame temporally leads the uplink frame. The downlink frame includes a preamble, a frame control header (FCH), a downlink (DL)-MAP, an uplink (UL)-MAP and a burst region, which are sequentially arranged.

A guard time for dividing the uplink frame from the downlink frame is inserted between the downlink frame and the uplink frame. A transmit/receive transition gap (TTG) is a gap between a downlink burst and a subsequent uplink burst. A receive/transmit transition gap (RTG) is a gap between an uplink burst and a subsequent downlink burst.

The preamble is used for initial synchronization, cell search, frequency offset and channel estimation. The FCH includes information on the length of a DL-MAP message and a DL-MAP message coding scheme. The DL-MAP message includes the position of a ranging section and resources allocated to each user equipment and the UL-MAP message includes information required for uplink transmission.

The cluster allocation message which is a downlink message can be included in the downlink frame. The cluster request message which is an uplink message can be included in the uplink frame.

A cluster connection identifier (cluster CID) can be allocated to a single cluster. A CID is a value through which connection of the base station and a user equipment in a medium access control (MAC) layer is confirmed. The base station and the user equipment are discriminated from each other using the CID. A cluster CID is allocated to each cluster such that the base station can recognize user equipments that transmit the same cluster CID as user equipments belonging to the same cluster.

Figure 8:
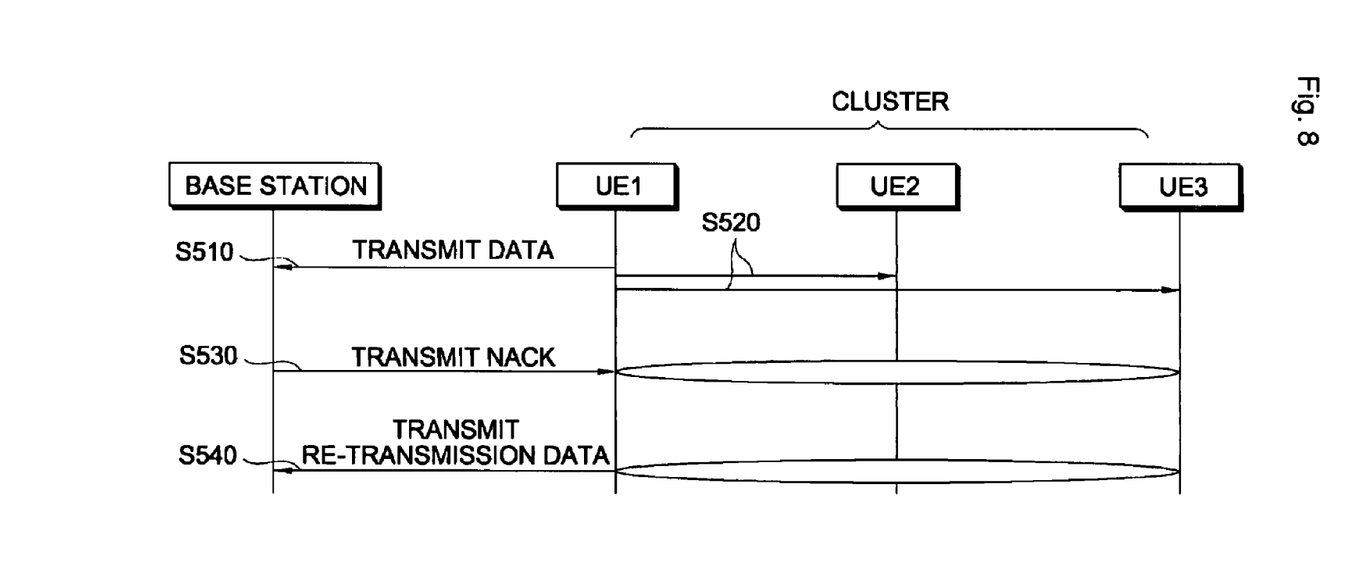
FIG. 8 is a flowchart shaving a method for transmitting data according to an embodiment of the present invention.

FIG. 8 is a flowchart showing a method for transmitting data according to an embodiment of the present invention. This is based on HARQ (Hybrid Automatic Repeat Request) scheme. Although it shows that a cluster includes first, second and third user equipments UE1, UE2 and UE3, there is no limit for the number of user equipments belonging to the cluster.

Referring to FIG. 8, a first user equipment UE1 transmits uplink data to a base station at step S510. Simultaneously, the other user equipments included in the cluster listens to the uplink data at S520. The first user equipment UE1 transmits the uplink data to the base station, and the second and third user equipments UE2 and UE3 receive the uplink data.

The base station transmits a negative-acknowledgement (NACK) message to the cluster when the error is detected from the uplink data at step S530. The NACK message can be received by all the user equipments UE1, UE2 and UE3 in the cluster. The base station can transmit an acknowledgement (ACK) message to the cluster when an error is not detected from the uplink data. The NACK message represents generation of error in the uplink data and corresponds to a re-transmission request message that requests the cluster to re-transmit the uplink data.

All the user equipments UE1, UE2 and UE3 in the cluster transmit re-transmission data to the base station ast step S540. The re-transmission data transmitted by each of the first, second and third user equipments UE1, UE2 and UE3 can have a weight. The weight includes transmission power and modulation and coding scheme. When the first user equipment UE1 is a main user equipment UE1 and the second and third user equipments UE2 and UE3 that listen to data of the main user equipment are auxiliary user equipments, the weight of the re-transmission data transmitted from the main user equipment can be larger than the weight of the re-transmission data transmitted from the auxiliary user equipments. For example, the transmission power of the re-transmission data of the main user equipment can be higher than the transmission power of the re-transmission data of the auxiliary user equipments. The cluster can be notified of the weights through a message.

When there is a re-transmission request from the base station, reliability of re-transmission data can be improved through cooperative transmission of the user equipments in the cluster.

Even a user equipment in the cluster may fail in listening to uplink data. For example, a user equipment can fail in receiving and decoding uplink data. The user equipment that fails in listening to uplink data can not send re-transmission data even though it receives the NACK message from the base station. A user equipment which succeeds in listening to uplink data participates in cooperative transmission.

Figure 9:
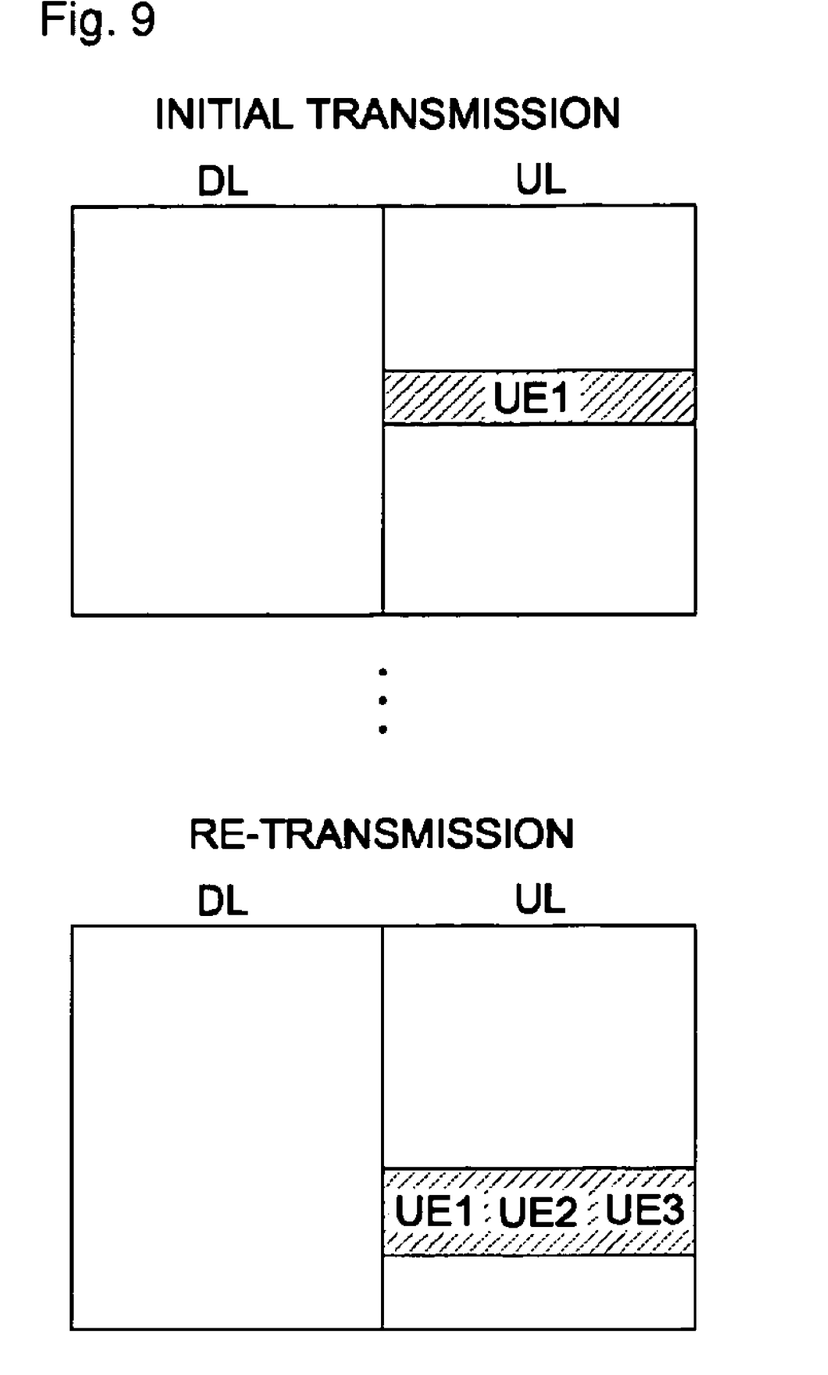
FIG. 9 illustrates allocation of radio resources for re-transmission.

FIG. 9 illustrates allocation of radio resources for re-transmission. User equipments in a cluster can re-transmit data through same radio resources as the radio resources used for initial transmission. Alternatively, the user equipments in the cluster can re-transmit data through different radio resources as the radio resources used for initial transmission.

Referring to FIG. 9, a first user equipment UE1 initially transmits uplink data through uplink resources.

In case of re-transmission, user equipments UE1, UE2 and UE3 in a cluster transmit re-transmission data through uplink resources different to the uplink resources used for initial transmission. Radio resources allocated for re-transmission include frequency resources, time resources and/or code resources different from frequency resources, time resources and/or code resources used for initial transmission.

While uplink transmission has been described, downlink transmission can be performed in the same manner. That is, a base station transmits downlink data to a main user equipment, and the other user equipments in a cluster listen to the downlink data. When the main user equipment requests the base station to re-transmit the downlink data, the other user equipments can transmit re-transmission data.

By MIMO system based on clustering of multiple user equipments, small ECC can be obtained without increasing the size of a user equipment. Furthermore, the MIMO system can be easily constructed using the existing user equipment having at least one antenna.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of cooperatively transmitting data in a wireless communication system, performed by a user equipment, the method comprising:
receiving a cluster allocation message from a base station, the cluster allocation message comprising a cluster identifier to identify a cluster, the cluster identifier being allocated to both a main user equipment and the user equipment;
listening to uplink data transmitted from the main user equipment in the cluster to the base station;
receiving a request for re-transmission of the uplink data from the base station; and
transmitting concurrently re-transmission data for the uplink data with re-transmission data transmitted by the main user equipment,
wherein a transmission power of the re-transmission data is lower than a transmission power of the re-transmission data of the main user equipment.

2. The method of claim 1, wherein the re-transmission data use different radio resources with re-transmission data of the main user equipment.

3. The method of claim 1, wherein the re-transmission data use same radio resources with re-transmission data of the main user equipment.

4. A user equipment configured to cooperatively transmit data in a wireless communication system, comprising a processor and a memory, the processor configured to:
receive a cluster allocation message from a base station, the cluster allocation message comprising a cluster identifier to identify a cluster, the cluster identifier being allocated to both a main user equipment and the user equipment;
listen to uplink data transmitted from the main user equipment in the cluster to the base station receive a request for re-transmission of the uplink data from the base station; and
transmit concurrently re-transmission data for the uplink data with re-transmission data transmitted by the main user equipment,
wherein a transmission power of the re-transmission data is lower than a transmission power of the re-transmission data of the main user equipment.

* * * * *